Nov. 12, 1963  A. J. LUNDI  3,110,296
FUEL PREHEATER AND ECONOMIZER
Filed April 24, 1961  2 Sheets-Sheet 1

Axel J. Lundi
INVENTOR.

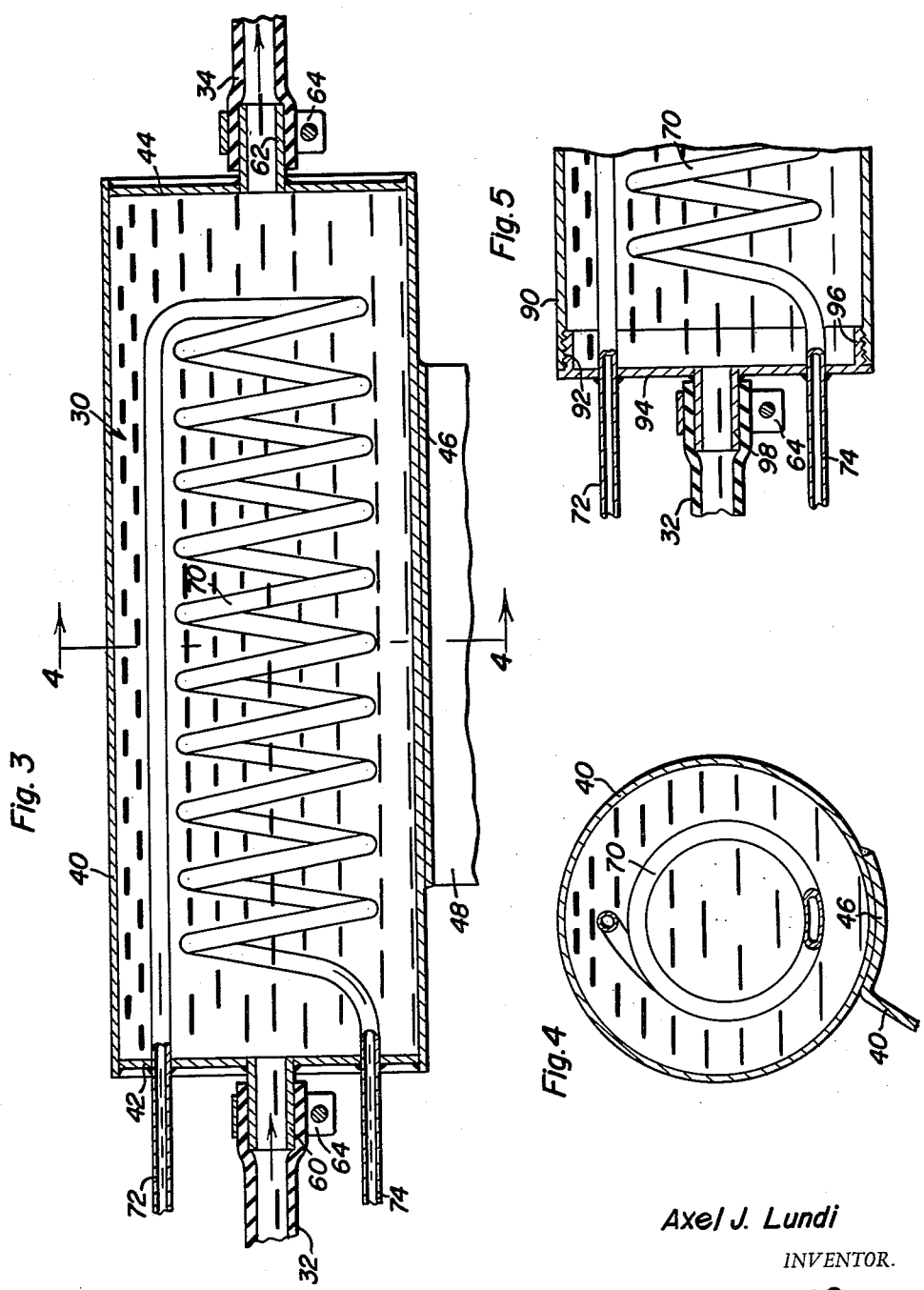
Axel J. Lundi
INVENTOR.

United States Patent Office 3,110,296
Patented Nov. 12, 1963

3,110,296
FUEL PREHEATER AND ECONOMIZER
Axel J. Lundi, 1633 N. 43rd Ave., Stone Park, Ill.
Filed Apr. 24, 1961, Ser. No. 105,096
7 Claims. (Cl. 123—122)

This invention comprises a novel and useful preheater and economizer and more particularly relates to a device for preheating the liquid fuel supplied from an engine fuel pump to the carburetor of an engine.

A further object of the invention is to provide a device in accordance with the preceding object in which the heat employed for preheating the liquid fuel is derived from the water circulating cooling system of an internal combustion engine.

Yet another object of the invention is to provide a gasoline preheater which shall provide an inbuilt reservoir for retaining heat for some time after cessation of the engine operation in readiness for preheating the fuel when the engine is again started.

Yet another object of the invention is to provide a device in accordance with the preceding objects which will enable all or any portion of the liquid fuel delivered by the engine fuel pump to be supplied alternatively to the preheater from the carburetor or directly to the carburetor in controllable proportions.

A still further important object of the invention is to provide a preheater in accordance with the preceding objects wherein a spiral heating coil carrying the liquid fuel to the preheater is immersed in heated water circulated through a tank by the engine water circulating cooling system and in which an improved relation is obtained between the spiral heating coil and the heated water to effect an improved, more rapid and more efficient heat exchange relation between the hot water and the liquid fuel and with a minimum obstruction to flow of the cooling water through the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a view in vertical longitudinal section through the preheater of FIGURE 2, taken upon an enlarged scale, and relative flow of fluids therein being indicated by arrows;

FIGURE 4 is a vertical transverse sectional and detailed view taken substantially upon the plane indicated by the section line 4—4 of FIGURE 3; and FIGURE 5 is a further detailed view of the left end portion of FIGURE 3 but showing a slightly modified construction.

The present invention contemplates both a novel and advantageous preheating device which may be readily applied to conventional internal combustion engines of the type employing as a part thereof a water circulating cooling system together with a source of fuel such as a fuel pump and a carburetor forming a combustible mixture to be supplied to the engine, as well as the entire fuel supply system incorporated into such an engine.

Figure 1:
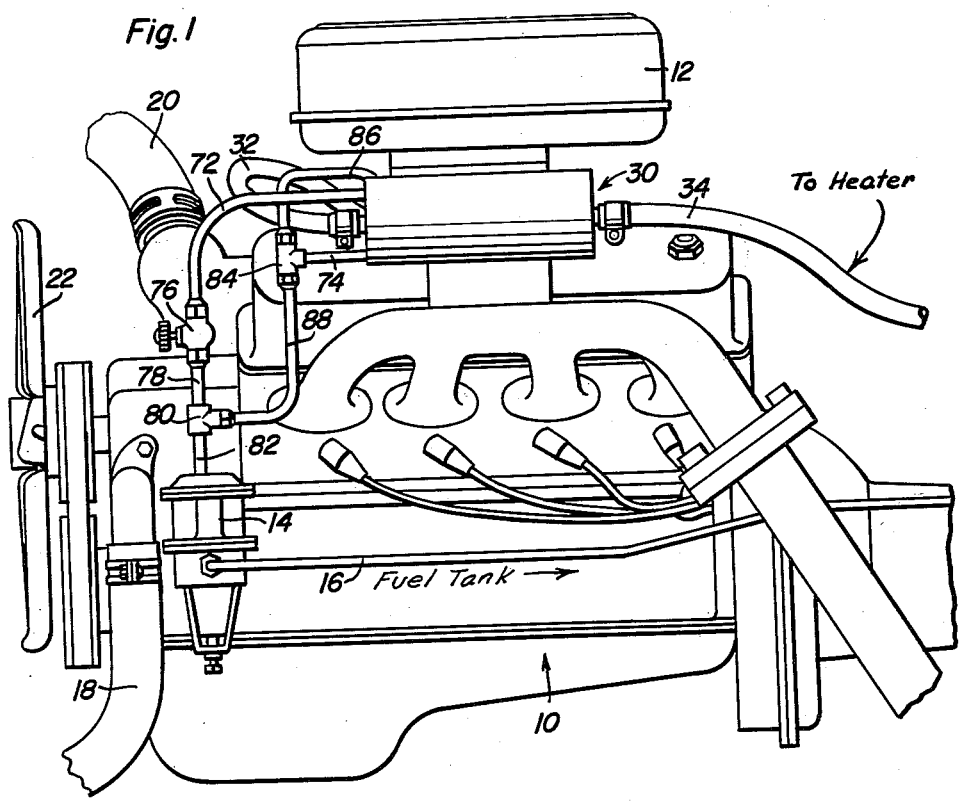
FIGURE 1 is an elevational view showing a portion of an internal combustion engine and its water cooling system to which the principles of the present invention have been applied in a preferred embodiment.

Referring first to FIGURE 1 which illustrates a typical manner of applying the principles of the invention, there is indicated generally by the numeral 10 an internal combustion engine of any suitable type which includes as conventional elements thereof a carburetor 12 by means of which a combustible mixture is delivered to the interior of the internal combustion engine together with a source of fuel such as a fuel pump 14 which receives fuel from a fuel tank, not shown, or any other suitable source such as the fuel suction line 16. The engine further includes any conventional type of circulating water cooling system, a portion of which only is indicated by the water hoses 18 and 20 it being understood that water is circulated by means of these hoses through the engine block and water jacket, not shown, and through the engine cooling radiator, the usual engine driven cooling fan 22 being provided to effect circulation of air through this radiator in a well known manner.

In accordance with the present invention there is applied to an engine of this general type a preheater unit indicated generally by the numeral 30 and which forms an essential component of the present invention. A pair of heated water inlet and outlet conduits 32 and 34 communicate with the interior of the preheater at opposite ends thereof for circulating heated water therethrough, these conduits being suitably connected in any desired manner, not shown, with the water circulating system of the internal combustion engine for supplying water heated by the operation of the engine to the preheater unit 30.

Suitable pipe or conduit means are provided to be hereinafter described in detail which connect the fuel pump 14 with the carburetor 12 and with the preheater unit 30 for selectively and proportionately delivering liquid fuel from the carburetor either to the heater or to the carburetor directly or to both.

Figure 2:
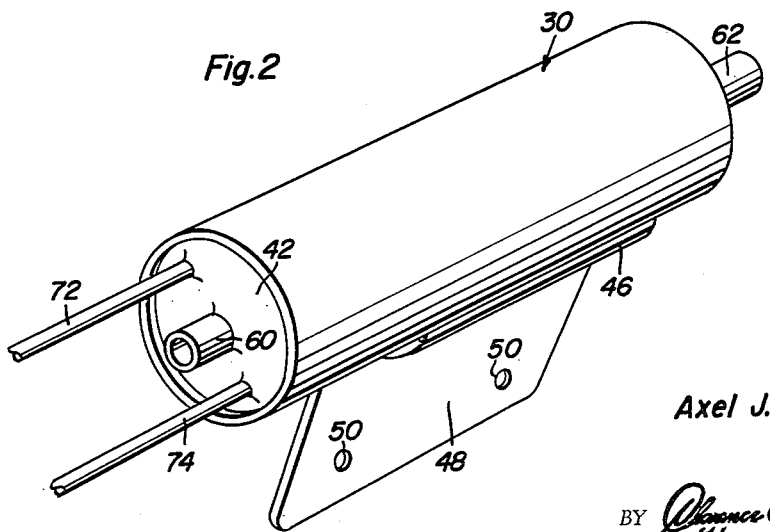
FIGURE 2 is a perspective view of the preheater element of the invention.

Referring now primarily to FIGURE 3 in conjunction with FIGURES 2 and 4 it will be observed that the preheater unit 30 consists of an elongated preferably cylindrical tank 40 whose open ends are closed as by a pair of end walls 42 and 44. The tank is preferably disposed in a generally horizontal position and is provided with a mounting bracket consisting of an arcuate plate 46 snugly embracing and secured as by welding to the underside of the tank 40, which plate has an angulated downturned mounting flange 48 thereon, apertured as shown at 50 in FIGURE 2, these apertures being so formed and the plate being so constructed as to provide a convenient means by which the preheater unit 30 may be readily attached to any suitable portion of the internal combustion engine adjacent to the carburetor. Inasmuch as the actual location and type of fastening by which the mounting bracket is secured to the engine will vary with different means of engines, and since the details of this mounting in themselves form no part of this invention as claimed hereinafter, a further description of the same is deemed to be unnecessary.

Continuing to refer to FIGURE 3 it will be observed that the two end walls 42 and 44 comprise circular plates which are received within the open ends of the cylindrical tank 40 and may be permanently mounted therein as by welding or the like, by screw-threaded engagement or by any other suitable fastening means, it being only necessary that they provide a secure fluid-tight closure for the ends of the tank. A pair of tubular bosses 60 and 62 are secured to, extend through and are disposed axially outwardly from the end plates or end walls 42 and 44 in alignment with each other. The previously mentioned water inlet and outlet conduits 32 and 34 which may comprise rubber hose or the like telescopingly embrace these bosses as shown in FIGURE 3 and are secured thereto by any suitable type of clamping means such as that indicated at 64. It will be observed that by this arrangement heated water from the engine water circulating cooling system is caused to pass longitudinally, centrally and axially into and out of the tank 40 in a straight line flow.

The tank is preferably of sufficient size to contain therein a sufficient quantity of water so that it will constitute a heat reservoir in which the heated water is available, even for a considerable time after the operation of the engine has ceased, as a means for preheating the fuel for the next starting of the engine.

Disposed within the tank 40 is a spiral heating coil 70 having a series of longitudinally spaced convolutions, this coil having its central axis disposed preferably along the central line of the two bosses 60 and 62 so that the sides and ends of the heating coil are substantially uniformly spaced from and at a selected distance from the cylindrical wall of the tank 40 and the two end walls 42 and 44 thereof. The size of the convolutions or diameter thereof is preferably such that the hollow passage through the spiral coil will embrace the normal straight line flow of the heating water from the boss 60 to the boss 62 in the direction indicated by the arrows in that figure.

The effect of this arrangement is such that the spiral configuration of the coil as the heated water flows therethrough will impart to this water a corresponding spiraling flow, thereby increasing the surface contact of the heated water with the coil and promoting both the efficiency and the rate of heat exchange therebetween. However, the configuration of the coil is such as to impart very little obstruction to normal flow through the device and therefore will minimize any obstruction to normal circulation of the cooling water in the engine circulating water cooling system.

The two opposite ends of the coil, as indicated at 72 and 74 extend through and are fixedly secured to and carried by one of the end walls or end plates such as that indicated at 42 and constitute part of the fuel supply and discharge conduits of the preheater unit. Referring now again to FIGURE 1 it will be noted that the conduit 72 is connected by a manually controlled valve 76 of any suitable construction with a further conduit 78 having a T-fitting 80 which in turn is connected to the discharge or delivery conduit 82 of the fuel pump 14. The delivery conduit 74 of the preheater unit communicates with a T-fitting 84 which through the conduit 86 communicates with the carburetor 12 for delivering heated fuel thereto. The further conduit 88 connects the T-fitting 84 with the previously mentioned T-fitting 80 of the delivery conduit 82 of the fuel pump.

It will thus be observed that a pair of alternative passages connect the fuel pump with the carburetor. Thus, by varying the degree of opening of the valve 76, the liquid fuel delivered by the fuel pump 14 may be caused to pass either directly through the conduit 88, T-fitting 84 and conduit 86 to the carburetor or may be caused to pass primarily through the conduit 72 into the heating coil 70 and from thence through the conduit 74, T-fitting 84 and conduit 86 to the carburetor. If desired a non-return valve of any conventional type may be applied to any of these conduits.

The arrangement is such that varying controllable proportions of liquid fuel may be applied directly to the carburetor and to the preheater.

A slightly modified construction of preheating tank is indicated in FIGURE 5. In this form the tank indicated by the numeral 90 has its open ends internally threaded as at 92 for receiving therein the two end walls of which one is indicated at 94. These end walls have diametrically reduced cylindrical externally threaded sleeves 96 thereon which engage with the threaded interior of the tank 90 to effect a fluid-tight seal therewith, the annular rim portion of the plates lying radially outwardly of the sleeve 92 having an abutting engagement with the ends of the sleeve as shown in FIGURE 5. Thus, a detachable closure having a fluid-tight connection is established for the tank. The same construction of heating coil 70 having inlet and outlet portions 72 and 74 is provided as set forth in connection with FIGURE 3, and each of the end plates likewise is provided with the axially disposed tubular boss 98 to which the previously mentioned water inlet and outlet conduits 32 and 34 as previously mentioned are detachably connected as by the clamping means 64. The operation of this form of the invention is identical with that previously described.

It will thus be evident that by this attachment the efficiency of operation of the internal combustion engine and particularly for starting the same may be greatly improved especially under cold weather conditions by virtue of the economical preheating of the fuel through use of the heat content of the circulating water cooling system of the engine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fuel supply system comprising in combination an internal combustion engine having a circulating water cooling system, a carburetor and a fuel pump for supplying fuel from a source of supply to said carburetor, a fuel preheater mounted on said engine adjacent said carburetor, connecting means communicating said preheater with said cooling system and circulating hot water through said preheater in a straight line flow with a minimum back pressure on said cooling system, means for circulating fuel to be heated in said preheater in heat exchange relation with the circulating hot water therein and in a path surrounding and extending substantially the entire length of but out of said straight line of flow of said hot water, a fuel supply conduit connecting said fuel pump with said connecting means and having a control valve therein, a heated fuel delivery conduit connecting said fuel circulating means to said carburetor, a fuel bypass conduit connecting said heated fuel delivery conduit to said fuel supply conduit between said valve and said fuel pump whereby to proportion the flow of fuel from said fuel pump to said preheater fuel circulating means and to said carburetor.

2. The combination of claim 1 wherein said preheater comprises an elongated tank having end walls, said connecting means including conduits opening through said end walls and aligned with and communicating with the interior of said tank for unidirectional straight line flow of water therethrough, said fuel circulating means comprising a coil having convolutions spaced longitudinally of said tank and surrounding the line extending through said conduits whereby to effect a swirling motion of the hot water passing through said tank about said straight line of flow.

3. A fuel preheater comprising a tank having opposed end walls, alined water inlet and outlet means each extending through an end wall and adapted for connection to the water cooling system of an internal combustion engine for effecting circulation of heated water through said tank in a path of straight line flow, a spiral heating coil disposed in said tank out of said path of straight line flow whereby to minimize resistance to water flow through said tank while being in good heat exchange relation to and being immersed in said circulating heated water, fuel supply and fuel delivery conduits for connecting the opposite ends of said coil respectively to a fuel pump and to an engine carburetor, bypass means connected to said fuel supply conduit and adapted for connection to said engine carburetor, said fuel supply conduit having a control valve therein, said bypass being connected to said fuel supply conduit on the approach side of said valve.

4. The combination of claim 3, wherein said tank and said heating coil are cylindrical, with the coil and said path of straight line flow being located centrally of said tank and uniformly spaced from the side and end walls of the latter whereby the spiral convolutions of said coil will surround said path of straight line flow and effect a spiral swirling of the heated water circulated through said tank to thereby increase the rate and efficiency of heat exchange between the water and coil.

5. The combination of claim 3 wherein said end walls have outwardly and axially projecting tubular bosses communicating with the interior of said tank and in alignment with each other, said water inlet and outlet means being embracingly secured to said bosses, and said end walls comprise circular plates having diametrically reduced externally threaded sleeves engaged in the open ends of said tank with annular rim portions of said plates abutting the ends of said tank.

6. The combination of claim 5 wherein said fuel supply and discharge means are secured to and extend through one of said plates.

7. The combination of claim 3 including a bracket secured to the exterior of said tank for mounting the latter on an engine.

References Cited in the file of this patent

UNITED STATES PATENTS

| | | |
|---|---|---|
| 1,168,111 | Pope | Jan. 11, 1916 |
| 1,300,600 | Giesler | Apr. 15, 1919 |
| 1,318,265 | Clemmensen | Oct. 7, 1919 |
| 1,391,709 | Wood and Roewekemp | Sept. 27, 1921 |
| 1,406,766 | Shipp | Feb. 14, 1922 |
| 1,623,074 | Tartrais | Apr. 5, 1927 |
| 2,231,525 | Breitling | Feb. 11, 1941 |
| 2,748,758 | Fairbanks | June 5, 1956 |